Jan. 19, 1943. P. NASCA 2,308,797
PARACHUTE
Filed March 16, 1940 2 Sheets-Sheet 1
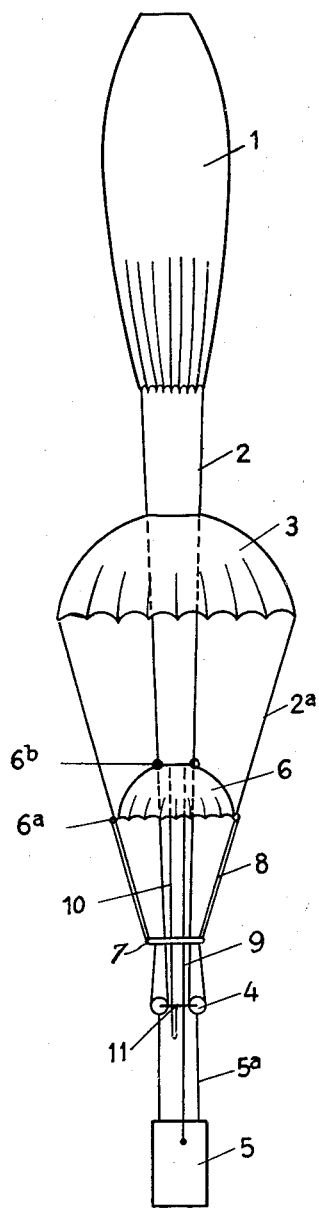
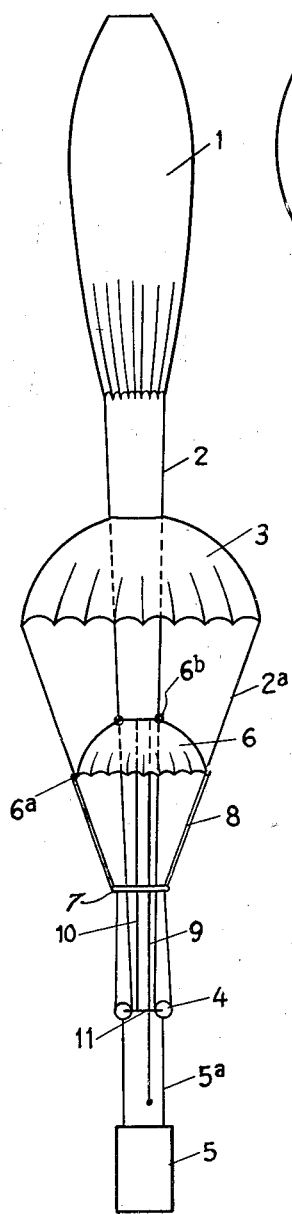
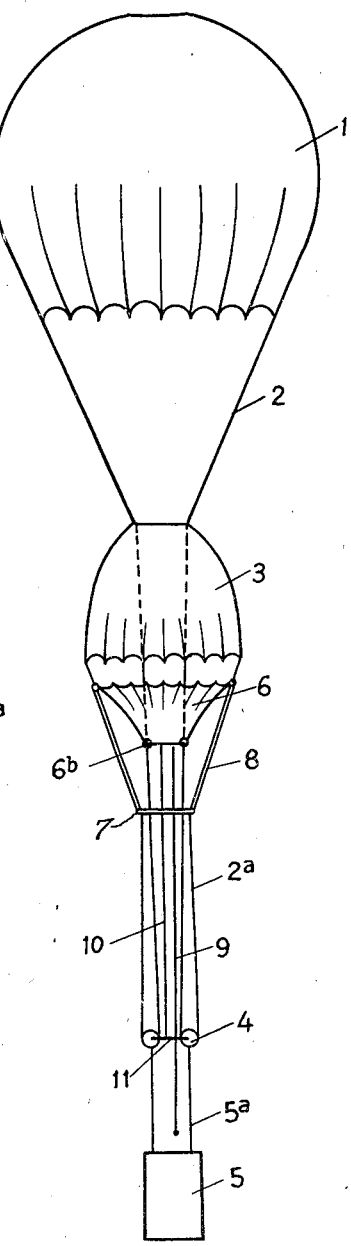
Inventor
Pasquale Nasca
by Sommers & Young
Attorneys Patented Jan. 19, 1943

2,308,797

UNITED STATES PATENT OFFICE 2,308,797

PARACHUTE

Pasquale Nasca, Rome, Italy; vested in the Alien Property Custodian

Application March 16, 1940, Serial No. 324,411
In Italy March 17, 1939

5 Claims. (Cl. 244—142)

This invention relates to a parachute adapted to be dropped from aeroplanes flying at high or low speed or at a low altitude and having means enabling the parachutist to retard opening, control the speed of descent and to a certain extent control the direction of descent. For the purpose of retarding the opening of the parachute canopy, an auxiliary canopy is arranged between the main canopy and the parachutist, said auxiliary canopy acting as a screen protecting the main canopy from being violently struck by the air until the speed of descent has decreased to a predetermined limit.

A further feature of the invention is an arrangement of rigging lines secured to the border of the main canopy and an auxiliary canopy and extending through the apex vent of the auxiliary canopy, wound in a loop and then extending upwards and fixed to the edge of the auxiliary canopy. The parachutist is suspended to the loop by means of pulleys. The interacting aerodynamic resistances of the main and auxiliary canopy causes the loop to slide on the pulleys increasing gradually the distance between the canopies.

The annexed drawings show diagrammatically by way of example an embodiment of the invention.

Figure 1 is a diagrammatic side view of a parachute having a primary canopy and the two auxiliary canopies, adapted to open successively, the primary canopy being still in closed condition while both auxiliary canopies are open;

Figure 2 is a view similar to Figure 1, with the means for controlling the opening of the primary canopy and upturning of the second auxiliary canopy operated but not yet effective;

Figure 3 is a view similar to Figures 1 and 2 but with the primary and first auxiliary canopies open and the second auxiliary canopy in reversed or upturned condition;

Figure 4:
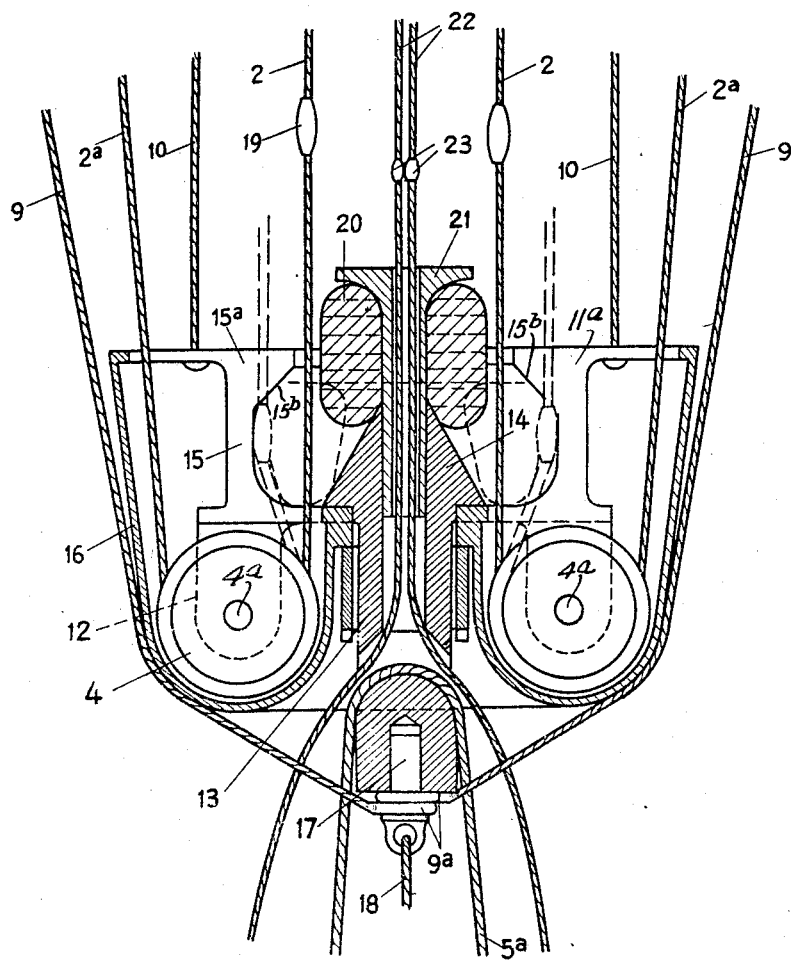
Figure 4 is a digrammatic sectional view of part of the rigging system wound on pulleys from which the parachutist is suspended.

In the drawings numeral 1 indicates a primary parachute canopy having an elastic apical vent provided with a rigging system connected to cords 2 led through the nonelastic apex vent in a first auxiliary canopy 3, said cords 2 being connected to the cords 2a of said first auxiliary canopy. The cords 2, 2a form loops encircling the pulleys 4 of a cage 11, to which the parachutist 5 is suspended. The cords 2 are led through a second auxiliary canopy 6, arranged at a suitable distance from the first auxiliary canopy 3, and a ring 7 supported by cords 8 secured to the canopy skirt. The edge of the second auxiliary canopy 6 carries rings 6a, 6b, one of the cords 2—2a secured to the edge of the canopy 3 passing through each of said rings. The border of the apical vent 6b in the canopy 6 is connected to the parachutist by means of a cord 9, which can be released by the parachutist and by means of a cord 10 secured to the cage 11 of the pulleys 4.

The inner side of the parachute 1 is placed in the pack at a suitable distance from the apical vent of the auxiliary canopy 3. When the parachute is first dropped, Figure 1, the parachutist, through his inertia, applies the tension to the whole system; the auxiliary canopy 3 is opened first and prevents the inner side of the parachute from being violently struck by the air.

When the parachute is dropped from an areoplane flying at great speed the opening of the parachute is retarded. As the descent speed decreases the auxiliary canopy 3 is further removed from the main canopy 1; the air strikes the latter (Fig. 3) and complete opening is effected.

When the parachute is dropped from an aeroplane flying at reduced speed or standing or flying at a low altitude, the primary canopy 1 should open immediately; the action of the auxiliary canopy 3 must therefore be eliminated. This is obtained by means of the auxiliary canopy 6, which is released by the parachutist by disengaging the cord 9 of the apex vent 6b; the canopy 6 under the influence of the air approaches the canopy 3 and the ring 7 clamps the cords 2 as long as the cord 10 applies a tension to the border of the apex vent. The canopy 2 is upturned by the wind (Fig. 3) eliminating the influence of the air on the canopy 3, which collapses. The primary canopy is fully struck by the air even at a low rate of descent.

The parachutist may reduce the opening of the canopy by means of cords secured to the canopy skirt thus increasing the rate of descent or controlling to a certain extent the direction of descent.

Fig. 4 shows by way of example a form of the cage 11 of the pulleys 4 supporting the parachutist. The ends of cords 2 of the primary canopy and cords 2a of the first auxiliary canopy 3 are attached to said cage, and the cords 9 and 10 of the second auxiliary canopy 6 are attached to the first auxiliary canopy. The cord 10 is fixed and cord 9 may be quickly released by the parachutist.

The cage is substantially constituted by a plate 11a provided with depending extensions 12 receiving the pivots 4a of pulleys 4, said extensions being arranged on a number of radii equal to the number of cords 2, 2a. The plate is provided with openings through which are led the cords 2 and a central large opening receiving a pivot 13, the conical head 14 of which rests on the plate. The parachutist is suspended from the pivot 13 by means of the cord 5a led through a diametric opening. The plate 11a carries a drum 15 having large radial slots and supporting, by means of a flange 15a and pivot 13 a casing 16 for the pulleys, one or more cords 10 being attached to said casing.

The cord 9 is unwound and secured to the end of the pivot 13 by means of an axial pin 17 passing through a loop 9a of each cord strand. The parachutist can release the pin 17 by pulling the string 18 thus disengaging the cords 9; the tension is then applied to the cords 10 owing to sliding of the auxiliary canopy 6.

Sliding of the cords 2, 2a when the parachute is being dropped is prevented by a lock mechanism, which may be released by the parachutist. The cords 2 and 2a are provided with stop knots 19, which are pressed and held by friction on the wall of the cylinder 15 (as shown in dotted lines) having inclined planes 15b by an elastic ring 20 forced on the conical head 14 by a mushroom head of the slide 21 sliding axially in the pivot 13. The slide 21 is formed with a longitudinal opening through which are led the cords 22 with knots 23 of larger diameter than the opening. By keeping one or both cords 22 stretched, the parachutist prevents the knots 19 of cords 2 from passing through the ring 20 and defers opening of the primary canopy, more particularly in case the parachute is dropped from an aeroplane flying at high speed or at a high altitude. The ring 20, on releasing the cords, rises through its elasticity along the conical head 14 releasing the knots 19; the cords slide freely, and the primary canopy opens as above described. The cords are attached at two diametrically opposite points of the edge of the primary canopy, said cords being of substantial length, so that, even in case of complete opening of the primary canopy, the cord ends are free and may be grasped by the parachutist, who, by pulling either of them, may direct the descent.

The constructional details of the primary and auxiliary canopies, the cage and all parts generally may be varied without departing from the spirit of the invention.

The second auxiliary canopy is not essential for the operation of the apparatus; its use may however be useful in certain flying conditions or resistance of the parachute.

What I claim is:

1. Parachute comprising a main canopy, an auxiliary canopy having an apical vent and arranged beneath said main canopy, supporting means for the parachutist suspension pulleys associated with said supporting means, a plurality of cords secured to the peripheral edge of the main canopy and led through the apical vent of the auxiliary canopy and on said pulleys and secured to the peripheral edge of said auxiliary canopy; so that on dropping the parachute said auxiliary canopy retards deployment of the main canopy.

2. Parachute comprising a main canopy, a first auxiliary canopy having an apex vent and arranged beneath said main canopy to retard deployment thereof, a second auxiliary canopy having an apex vent and arranged beneath the first auxiliary canopy to annul its action at the desired moment, a ring beneath said second auxiliary canopy, cords connecting said ring to the edge of the second auxiliary canopy, a suspension cage for the parachutist arranged beneath said ring, pulleys associated with said cage, a bundle of cords secured to the peripheral edge of the main canopy and led through the apical vent of both auxiliary canopies and ring and on the pulleys and upwards along the peripheral edge of the second auxiliary canopy and secured to the peripheral edge of the first auxiliary canopy, a cord attached to the border of the apex vent of said auxiliary canopy and anchored to the cage in such manner as to be released by the parachutist when desired, a second cord connecting permanently the edge of the apex vent of the second auxiliary canopy to said cage, said second cord being slack when the first cord is anchored, so that, when the first cord is released, the second auxiliary canopy approaches the first auxiliary canopy and is upturned substantially closing the aperture of the first auxiliary canopy which collapses thus leaving free passage to the air towards the aperture of the main canopy.

3. Parachute, as claimed in claim 2, comprising lock means in the cage to prevent sliding of the cords passing on the pulleys.

4. Parachute, as claimed in claim 2, comprising, in the cage, a suspension hollow pivot having a conical head, a hollow slide provided with a mushroom head sliding in said pivot, an elastic ring fitted on said slide, knots in the cords passing on the pulleys, strings with stop knots led through the opening of said slide and actuated by the parachutist to press the elastic ring through the action of the slide on inclined surfaces of the cage to hold the knots of the cords passing on the pulley preventing sliding thereof, release of the strings allowing the elastic ring to free the knots in the cords passing on the pulleys allowing sliding thereof.

5. Parachute, as claimed in claim 2, comprising, in the cage, a suspension hollow pivot having a conical head, a hollow slide provided with a mushroom head and sliding in said pivot, an elastic ring fitted on said slide, knots in the cords passing on the pulleys, two strings with stop knots led through the sliding opening and secured at diametrally opposite points of the peripheral edge of the main canopy, said strings being if desired simultaneously actuated by the parachutist to press the elastic ring by means of the slide against inclined walls of the cage to hold the knots in the cords passing on the pulleys and prevent sliding thereof, release of said strings permitting the elastic ring to release the knots of the cords passing on the pulley to allow sliding thereof, the alternate action on said strings permitting to impart a certain direction to the parachute.

PASQUALE NASCA.